United States Patent
Ochoa

(10) Patent No.: US 6,428,080 B1
(45) Date of Patent: Aug. 6, 2002

(54) STIFFENERS FOR AUTOMOTIVE VEHICLE CLOSURES

(76) Inventor: Carlos M. Ochoa, 5353 Keller Springs Rd., #722, Dallas, TX (US) 75248

(*) Notice: Subject to any disclaimer, the term of this patent is extended or adjusted under 35 U.S.C. 154(b) by 0 days.

(21) Appl. No.: 09/829,576

(22) Filed: Apr. 10, 2001

Related U.S. Application Data

(63) Continuation-in-part of application No. 09/707,657, filed on Nov. 7, 2000, which is a continuation-in-part of application No. 09/389,163, filed on Sep. 2, 1999, which is a continuation-in-part of application No. 09/263,684, filed on Mar. 5, 1999, now Pat. No. 6,082,429, which is a continuation-in-part of application No. 09/116,689, filed on Jul. 16, 1998, now Pat. No. 5,954,111.

(51) Int. Cl.$^7$ ................................................. B60J 5/00
(52) U.S. Cl. ................................. 296/146.6; 296/188
(58) Field of Search ........................... 296/146.6, 188; 49/502

(56) References Cited

U.S. PATENT DOCUMENTS

| | | |
|---|---|---|
| 3,423,122 A | 1/1969 | Wessells |
| 3,423,123 A | 1/1969 | Wessells |
| 3,455,595 A | 7/1969 | Wessells |
| 3,590,936 A | 7/1971 | Wessells |
| 3,868,796 A | 3/1975 | Bush |
| 3,938,288 A | 2/1976 | Roubinet |
| 4,090,734 A | 5/1978 | Inami et al. |
| 4,234,225 A | 11/1980 | Harasaki et al. |
| 4,300,315 A | * 11/1981 | Holzwarth |
| 4,866,883 A | * 9/1989 | Brown et al. |
| 4,934,751 A | 6/1990 | Shimoda |
| 5,040,334 A | * 8/1991 | Dossin et al. |
| 5,536,060 A | * 7/1996 | Rashid et al. |
| 6,020,039 A | 2/2000 | Cline et al. |

* cited by examiner

Primary Examiner—Joseph D. Pape
Assistant Examiner—Scott Carpenter
(74) Attorney, Agent, or Firm—Browning Bushman P.C.

(57) ABSTRACT

A closure for an automotive vehicle has a sheet body mounted for pivotal movement about a rotational axis between open and closed positions. A pair of parallel stiffeners extend in a parallel relation from the rotational axis and each stiffener has a body or web with a mounting flange extending in perpendicular relation from one end of the web and a bowed flange extending from the opposite end of the web. The flanges have free edges and an inturned bead or curl is formed on each free edge for stiffening of the flanges.

23 Claims, 3 Drawing Sheets

STIFFENERS FOR AUTOMOTIVE VEHICLE CLOSURES

REFERENCE TO RELATED APPLICATIONS

This application is a continuation-in-part of application Ser. No. 09/707,657 filed Nov. 7, 2000; which is a continuation-in-part of application Ser. No. 09/389,163 filed Sep. 2, 1999; which is a continuation-in-part of application Ser. No. 09/263,684 filed Mar. 5, 1999, now U.S. Pat. No. 6,082,429 dated Jul. 4, 2000; which is a continuation-in-part of application Ser. No. 09/116,689 filed Jul. 16, 1998, now U.S. Pat. No. 5,954,111 dated Sep. 21, 1999.

FIELD OF THE INVENTION

This invention relates generally to a reinforcing support structure for an automotive closure, and more particularly to stiffeners integrated with the sheet-structural closures.

BACKGROUND OF THE INVENTION

Automotive closures consist predominantly of stiffened sheet structures. Closures include such components as doors, hood, trunk lid, and hatches. They represent a special challenge for the automotive designer because they must be light-weight and manageable for persons operating them during installation and service. In addition, they must be able to resist typical sources of cosmetic and functional damage from external loads during service. At the same time they must substantially contribute to the overall safety, cost effectiveness, structural rigidity and crash worthiness of the vehicle. These important design mandates have accented the necessity for a general, economical, and structurally viable sheet material stiffener capability for reinforcing automotive closures.

Over the past several years government-mandated vehicle crash test requirements as well as government and industry fuel economy and safety goals have driven the automotive industry toward lighter, stronger, more energy absorbing, and tailorable structures for integration with automotive closures, including those used in cars, trucks, minivans, and sport utility vehicles, in order to maximize structural efficiencies related to these goals. Viable candidate concepts must be capable of addressing not only performance goals, but also economies related to processing, forming, structural integration/configuration, tooling, and assembly requirements. The automotive industry has thus embarked on an exhaustive search for simple, enabling technologies that might fulfill these requirements.

Generally speaking, even the most favored technologies have met only some of the goals, in spite of the significant advantages made possible by using the latest and most advanced technologies now available in computer-based structural simulation and stress analysis as well as in optimization software. These efforts have sometimes made use of very high and ultrahigh strength materials including specially developed steel and extrudable aluminum alloys, as well as ceramic fiber reinforced plastics and metals. Yet they have largely failed to produce a lasting new approach to addressing the needs of the designer.

The most commonly resulting trend has been for weight saving goals to be heroically accomplished in tandem with significant penalties in the areas of tooling, material processing, fabrication, and assembly costs. At times, form and style have yielded to functional goals. The total net cost savings has sometimes been marginal. This is because of the complex cross sections and interfaces that are sometimes created as mass is redistributed using an increasingly intricate and localized level of control over the cross section of each structural component. As a result, integration, complexity and space claim issues have typically risen to join a growing list of challenges.

Some of the favored cross sections have included modified tubes, hat-shaped cross sections, and C-channels of various types. Each of these shapes offers specific challenges in the area of interfaces and joints. Some of these shapes have been formed under very high fluid pressures that may themselves have presented new safety and training challenges in their implementation in the workplace. One common scenario in these cases has been that as design ratios of cross sectional dimensions such as outer diameter-to-thickness or depth-to-thickness ratios exceed the range of about 50, both closed and open sections may have entered a range of relatively high sensitivity to local wall thinning during fabrication, as well as sectional buckling and reduced bending rupture resistance in service.

Furthermore, the use of thinner material in traditional open-section stiffener configurations makes these stiffener sections more susceptible to edge stress concentrations that are characteristic of open sections, especially under bending and compression loads. This is because conventional thin open sections commonly have a "blade edge". This edge is very susceptible to imperfections in the sheet material along this edge as well as to damage during manufacture, shipping/handling and installation. These imperfections along the blade edge become stress concentration points or focal points at which failure of the stiffener can initiate. A more detailed description of this failure initiation follows.

Even the most perfect, smooth edge of the conventional stiffener may experience a very localized point of high stress gradient due to the characteristic edge stress concentration associated with open sections under bending loads. Thus, initiation of an edge "bulge" or "crimp" on a perfect smooth edge is nothing more than the creation of an edge imperfection that is large enough to grow or "propagate" easily. It is significant that this stress concentration may be made worse by the presence of any relatively small local edge imperfections, even those on the order of size of the thickness of the stiffener material itself.

These imperfections near the edge can be in the form of edge notches, waviness (in-plane or out-of-plane), local thickness variations, local residual stress variations, or variations in material yield strength. Where multiple imperfections occur together, they may all compound together to further increase the stress concentration effect, and thus lower the load level at which failure is initiated. Thus, the existence of any edge imperfections in a conventional open section stiffener has the effect of enhancing an already established process of failure initiation.

Local complexity in the structural cross sectional shape of thin conventional stiffeners can further degrade structural stiffness and buckling resistance. Buckling is an instability in a part of the stiffener associated with local compressive or shear stresses. Buckling can precipitate section failure of the stiffener. This in turn can cause a stress concentration in adjacent structures that can cause a larger section to fail. This effect is of great concern in the evaluation of crash worthiness of automotive closures, because such failures may be less uniform or predictable, making them less desirable from an occupant safety standpoint. In addition, they may not absorb sufficient crash energy or resist intrusion effectively enough to consistently meet safety performance goals.

Finally, some thinner conventional stiffeners can experience "rolling" when placed under load. Rolling is when the shear stresses within the stiffener result in a net torque about the centroid of the thin walled cross section, thus causing the cross section to twist, possibly making the stiffener unstable. Another cause of rolling is the curvature of the stiffener itself, after it has been formed to the local contour of the vehicle. Some designers have increased the cross sectional length of the open-section member flanges having free edges while attempting to solve the rolling problem but were met with only marginal improvement. This is because the increased flange length had the simultaneous effect of increasing the distance from the centroid to the shear center of the channel. Additionally, increasing the cross sectional flange length sometimes caused difficulty in accessing the interior of the section during assembly or other operations while worsening space claim issues.

Yet another problem facing thinner conventional structural stiffeners is that of fastening or joining relatively thick sections to sections that are relatively less thick, or relatively stiff sections to sections that are relatively less stiff near the joint or interface. This can result in a local stress concentration in the region of joining. These stress concentrations may significantly weaken the joints or interfaces associated with conventional stiffeners.

Hydroformed tubes have gained some favor recently, but are cost intensive in terms of tooling. They are complex to form, and become increasingly so with added length, because of load introduction challenges during forming. They also represent some unique joining and load introduction problems during service because local joints can easily induce local section instability that can quickly propagate over the cross section under load. These sections are particularly susceptible to transverse loads, which limits their effectiveness under crash related conditions. Particular problems related to forming include local wall-thinning that is not readily detected through visual observation. For these reasons and others, hydroformed tubes are sometimes perceived to lack the necessary robustness for general automotive applications.

Computer optimization codes often help in the design of conventional stiffeners, but can be disappointing because they may not fully capture the degradation in practical performance, and increased sensitivity to geometric and material imperfections that has brought largely empirical guidelines into widespread acceptance over the years. Moreover, as conventional stiffening cross sections are made thinner, damage tolerance may rapidly become an even greater concern. Load paths and local fastener stresses become more difficult to evaluate. Even minor repair is sometimes out of the question due to special welding or joining techniques that do not lend themselves to repair shop environments.

Because of ever increasing safety and performance standards, there is clearly an established need for a new and innovative automotive closure sheet-structural stiffening system. The new system should combine traditional versatility and simplicity with design flexibility and tailorable structural efficiency to achieve both weight saving and crash worthiness objectives, while not casting a shadow on form and style. Such a system should specifically address and overcome the significant limitations of conventional stiffener shapes, without resorting to extreme measures, for example in fabrication or joining approaches. Such a system should largely follow existing intuitive conventions for joining and forming, handling and processing, without presenting additional obstacles to workers or to the environment.

SUMMARY OF THE INVENTION

The present invention alleviates and overcomes the above mentioned problems and shortcomings of the present state of the art through a novel automotive stiffener. The novelty and uniqueness of this invention is that it: 1) is made of thinner material to reduce the in-plane interface stresses found in the sheet interface areas, 2) resists deflection adequately to meet new higher structural stiffness requirements, 3) is resistant to buckling and rolling, 4) effectively addresses edge stress concentrations by modifying the blade edge to an area of relatively low stress, 5) provides a special interfacing flange capability that results in stronger and more crash resistant joints, 6) is synergistic with the use of thinner and stronger materials, and, 7) can be manufactured cost-effectively by using conventional forming methods such as roll forming and stretch forming.

This novel invention may be described as a substantially reconfigured or stabilized J-stiffener having a specially configured interface and mounting flange capability. It should be noted here that due to their extreme susceptibility to rolling, conventional J-stiffeners are seldom used in automotive applications. The unexpectedly strong synergisms of the unique characteristics found in the stabilized J-stiffener not only address the above problems, but simultaneously obtain significant material savings. More particularly the synergisms may be described as follows.

The instant invention has substantially redistributed material at critical locations as compared with conventional stiffener or structural member configurations. This material redistribution has the effect of altering considerably the behavior of the stiffener as compared with conventional J-stiffeners and other stiffener configurations.

The material redistribution required to accomplish these collaborative effects is accomplished by having specifically placed free edge portions, which are turned as folds to define tubular beads or curls along the free edges. Moreover it is not just the presence of the tubular bead or curl that enables the substantial level of synergism, but the discovery of specific ratios of curl diameter to other stiffener dimensions that maximize these synergisms even to the extent of obtaining significant weight savings.

Three main sets of synergisms combine to make the present invention successful. The first set of synergisms is directly related to the ratio of the diameter of the curl to the stiffener section flange length and web length. Each tubular bead has a cross sectional dimension which when combined in specific ratios with other stiffener dimensions substantially maximizes the moment of inertia of the overall section about the horizontal and vertical axes with a minimal use of material. Moreover, the tubular bead size specified by these same ratios has the effect of altering the characteristic failure mode normally associated with the free edge stress concentration of conventional stiffeners as described above. Not only does this substantially enhance in-service performance, but it also increases the formability of the stiffener by enabling the section to respond more uniformly during three-dimensional fabrication operations such as roll forming, pressing, or stretch-forming. Finally, the cross sectional dimensions of the tubular beads of the stabilized J-stiffener make this novel stiffener less sensitive to edge imperfections and damage because the blade edge has now been placed in a position of relatively benign stress levels so that imperfections or damage to the tube or edge region have to be on the order of size of the diameter of the curl in order to have significant detrimental effect to the stiffener section.

Having established the above ratios, a second set of synergisms was discovered by directly combining the above with specific ratios of the stiffener's cross sectional web dimension to cross sectional flange dimension. The compounding effect of the first set of synergisms with this additional set of ratios makes the stabilized J-stiffener more resistant to rolling and buckling and thus avoids the problems that plague deeper conventional automotive closure stiffeners using thinner gauge material. Additionally these compounding synergisms make this stiffener unique in that stresses are now more evenly distributed in the flanges, thus making the stiffener more stable and less sensitive to dimensional imperfections. Because of these cooperative effects, the stabilized J-stiffener demonstrates its uniqueness and efficiency in using thinner gauge material to reduce in-plane stresses found in the fastener, interface, or joint areas, thus allowing the other automotive closure components and the stiffener to work together as a cohesive system instead of as individual components.

The third set of synergisms relates to intermediate interface flanges of the stabilized J-stiffener. These intermediate flanges extend the capability of the J-stiffener in the following way. They permit the stabilized J-stiffener to be integrated more easily and successfully with complex arrangements of structural members, while substantially maintaining the benefits of the present invention. These intermediate interface flanges are formed according to precise and specific ranges of the angle defined between adjacent flanges, and according to specific ranges of radius-to-thickness ratios of the bend region between these flanges. The result is that the adjacent flanges to an interface flange work together to provide a significantly stabilized and strengthened interface region that lends itself to a variety of fastening or joining approaches, without substantially compromising the performance of the stiffener. In addition, when fasteners or local joints are used, an innovative barrier to crack propagation and fracture in the joint region is created. Because this innovation allows the stabilized J-stiffener to effectively address the problems of fracture and in-plane stresses at interfaces, increased performance is made possible at a larger level without significantly adding complexity and tooling costs.

Some of the mechanisms and technical advantages of better stabilization against crack growth that may originate near a bolt hole, a weld, or at other interface or joint locations along the length of the stiffener may be further described as follows. Enhanced fracture resistance is enabled by the combined effect of radius and angle between two adjacent flanges, and is still further enhanced in a compounding manner by the appropriate choice of radius to thickness ratio. This ratio serves to accomplish the dual role, first of maximizing the amount of strain hardening in the radius region which itself serves as a barrier to crack growth, and second, of emphasizing the stiffening and constraining role of one flange with respect to the other which serves as an additional crack barrier. Thus, within prescribed ranges, these variables may be changed along the length of the stiffener along with flange widths to accomplish various design goals, while substantially retaining the benefits of the teachings of the present invention. The dual stabilization that is achieved has a compounding effect against the growth of cracks that may originate near interfaces, joints, or welds or at other locations along the length of the stiffener. It results in a stronger, more stable interfaced stiffener that is better able to resist damage resulting from impact for example by another vehicle. The combined effect is so significant that for some applications the strength of the resulting interface flange joint may be increased by as much as a factor of about three (3).

When compared with conventional stiffeners on the market today, the stabilized J-stiffener uses substantially thinner material while obtaining better structural performance.

Thus, even though additional slit width (width of the sheet of material from which the stiffener is made) is required to reposition needed material, the use of thinner gauge material more than offsets the additional slit width, bringing overall material savings as high as 20 percent in many instances. This innovation in system configuration also represents a substantial cost savings for the manufacturer, since material cost is a substantial portion of total manufacturing costs for automotive closure hardware. Thus, this unique and novel stiffener is very cost effective.

For manufacturing process cost efficiency, the tubular bead is preferably an open-section bead, meaning that the sheet material is formed in an almost complete bend or curl, but the curl need not be closed near its outer edge, such as by welding. A closed section tubular bead would work equally well, at a slightly higher manufacturing cost.

This edge feature is discussed in more detail in the following paragraph. The edge-flange section curl and the trough curl are folded tubular features, preferably open-sections, that are made by shaping the free edges or edge marginal portions of the stiffener cross sections into a generally elliptical, preferably circular, cross sectional shape. As used herein, a circular cross section is an embodiment of an elliptical cross section and is covered by the term "elliptical cross section" or "elliptical cross sectional shape." The term "characteristic diameter" refers to a constant diameter in the case of a circle, while other elliptical shapes will have major and minor axes or diameters, with the minor axis or diameter being the "characteristic diameter".

Even though some configurations of a slightly non-circular elliptical shape may be more desirable in some applications, the circular cross section is generally preferable, because it is simpler to manufacture, while still achieving the desired benefits to a significant degree.

It is important to contrast the edge curl approach against other possible edge treatment approaches by noting that the dimensional order of size effect related to imperfections or damages described above for the curl can not be achieved by simply folding the edge over, either once or multiple times, because in this case the characteristic dimension will be defined by the fold edge diameter and not by the length of overlap of the fold. This is because the overlap direction is transverse to the edge and quickly moves out of the peak stress region, and because the edge fold diameter defines the maximum distance over which the edge stresses may be effectively spread.

The elliptical or circular open-section tubular shape or "edge curl" is contrasted to tubular sections of rectangular cross sectional shapes, including folded edges, and to open-section tubular shapes of softened corner rectangular cross sectional shapes in that the characteristic diameter will be defined in each of these other cases by the fold diameter or by the softened corner diameter nearest to the stiffener edge, as opposed to the overall diameter of the edge curl section. It may be noted that in this context a rectangular cross section with very softened corners is in effect an imperfect ellipse or circle.

In some instances, quasi-elliptical or quasi-circular cross sections, teardrops, imperfect ellipses, and imperfect circles, in the form of polygons or rectangular cross sections with some rounded regions may function adequately, but may also be more difficult to manufacture and may be less effective than a generally circular curl. Including local offsets or adding material locally such as by bonding or welding strips of material or high strength fibers or wires are additional examples. Yet other examples include local modifications to the material such as by heat, electromagnetic, chemical, or deformation treatment of the tubular bead cross section or of adjacent regions. In spite of the potential for additional fabrication costs, some of the above variations may at times be desirable for example in local regions where the designer desires local regions of modified cross sectional shape for space claim, interfacing, or joining reasons, or in special cases where such features may be combined with other features such as notches, folds, or hole patterns near the edge region in order to induce a prescribed response of the stiffener, such as in addressing crash energy absorption design related goals. In some applications the curl may be formed by turning the edges through an arc of up to 360 degrees, 720 degrees, or even more, so that the edge loops over one or more times on itself, in order to concentrate mass locally or to address other design objectives. In these cases manufacturing economy and complexity are also considerations.

Some of the substantial advantages made possible through the teachings of the present invention may be summarized as follows. They include the synergistic effect of the stabilized J-stiffener's material efficiency in obtaining the desired bending rigidity or moment of inertia, the alteration of the characteristic failure mode, the reduction in sensitivity to edge imperfections and damage, higher fracture resistance and more stable stresses in the regions of joints and interfaces, resistance to buckling and rolling, as well as the ability to spread stresses more uniformly. These features offer the same degree of compounding advantage as the conventional stiffener's compounding disadvantage of low resistance to buckling and rolling combined with sensitivity to relatively small edge or dimensional imperfections. Accordingly, it can now be appreciated by those versed in this art, that the novel stabilized J-stiffener of the instant invention provides a solution to the problems that the automotive closure art has sought to overcome.

In summary, the stabilized J-stiffeners of the present invention, having specially configured interface capabilities including mounting flanges that are uniquely designed to be compatible with substantially all types of standard automotive structures, are thereby significantly capable of lowering costs and reducing the number of stiffener types that designers must consider to achieve their objectives. These novel stiffeners thus permit more stringent structural and safety requirements to be met. Since they are quite adaptable, they often permit this to be done without major modification of other hardware.

The following description of the present invention may incorporate dimensions that are representative of the dimensions which will be appropriate for some common automotive applications. Recitation of these dimensions is not intended to be limiting, except to the extent that the dimensions reflect relative ratios between the sizes of various elements of the invention, as will be explained where appropriate.

DESCRIPTION OF THE INVENTION

Figure 1:
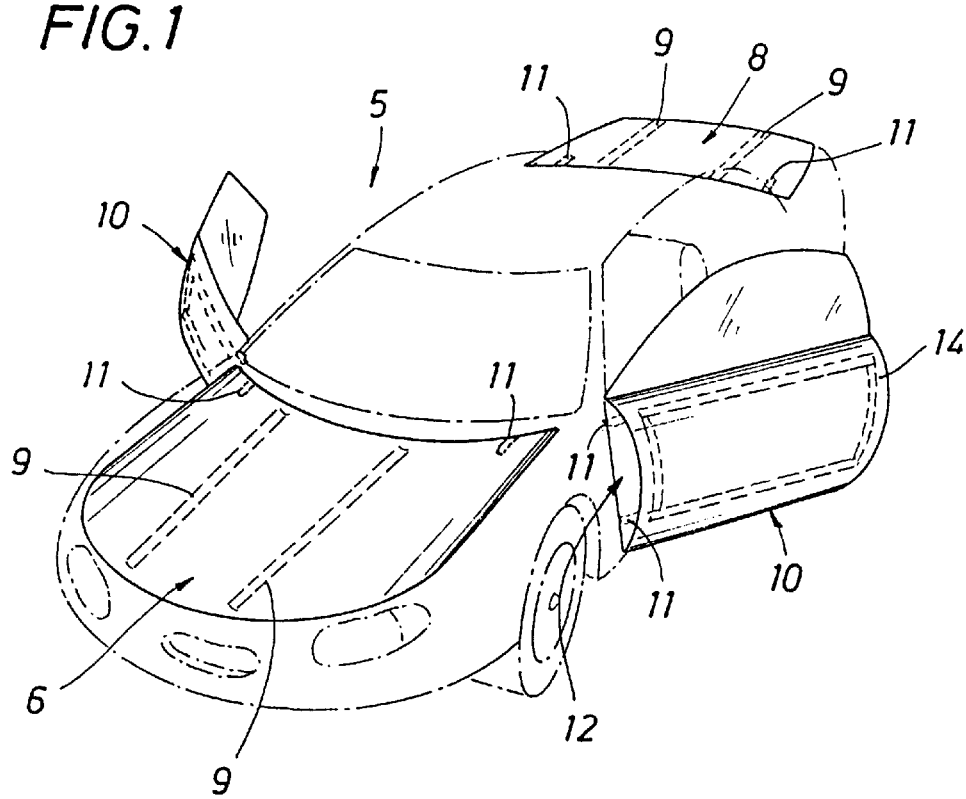
FIG. 1 is a perspective of an automobile showing typical closures, including a hood, doors, and trunk lid.

Referring now to the drawings for a better understanding of the invention, FIG. 1 shows an automotive vehicle at 5 having various closures including a hood 6, a trunk lid 8, and doors 10. Each closure 6, 8, 10 is mounted for pivotal movement about hinges 11 between open and closed positions. Stiffeners 9 for hood 6 and trunk lid 8 extend in a generally transverse direction from the axis of rotation of hood 6 and trunk lid 8 about hinges 11. Door 10 fits against a door frame 12 which mounts hinges 11 for pivotal movement of door 10 between open and closed positions. A handle 14 is mounted on door 10 near the opposite end from hinges 11.

Figure 2:
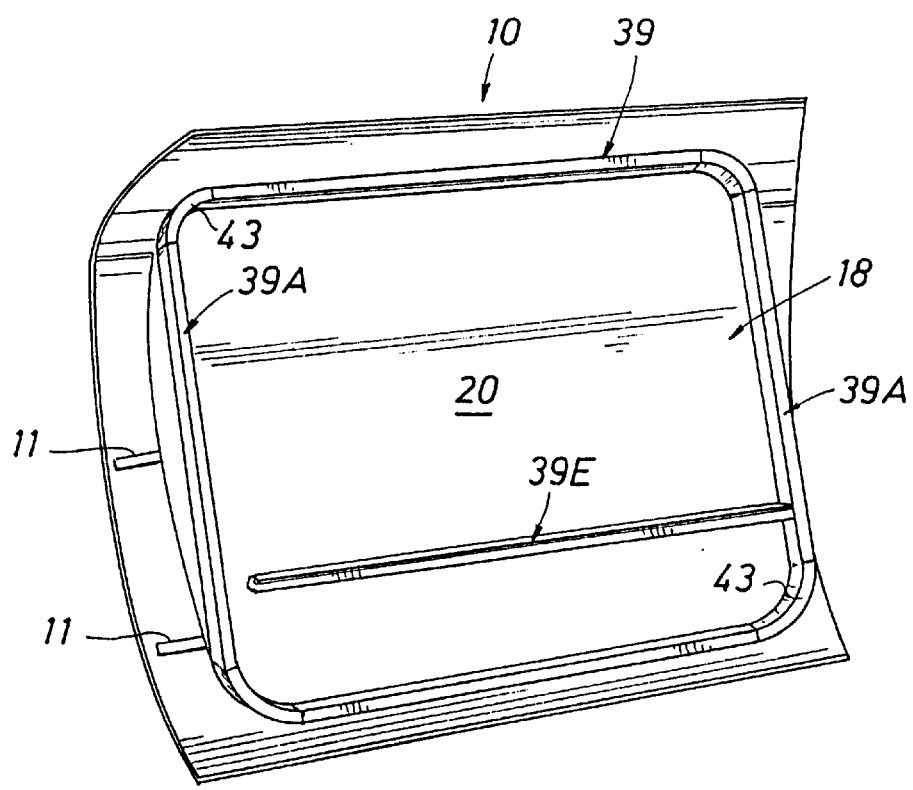
FIG. 2 is a perspective of the inner side of an automotive door removed from the automotive vehicle and having hinges mounted near one edge for pivotal movement of the door between open and closed positions with stabilized J-stiffeners of the present invention including vertical and horizontal J-stiffeners having mounting flanges mounted to the inside surface of the outer door panel in order to increase the crash worthiness and bending stiffness of the combined structure.
Figure 3:
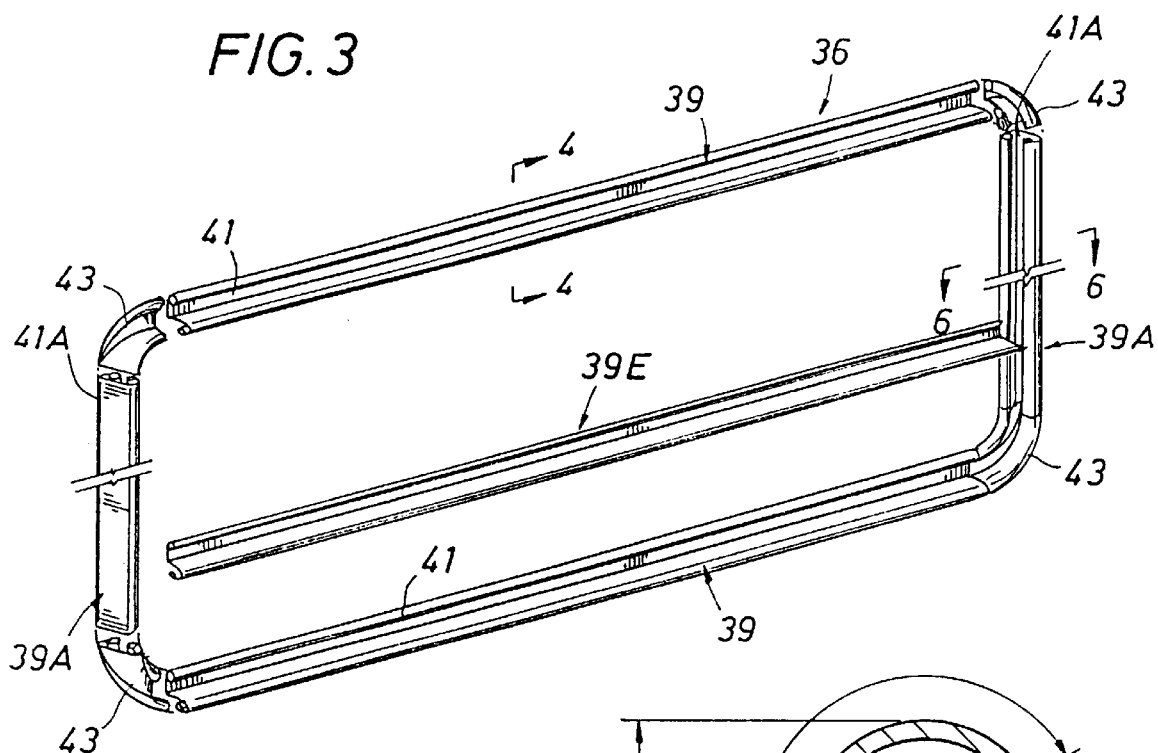
FIG. 3 is a perspective of a subassembly of the automotive door shown in FIG. 1 showing five J-stiffeners of the present invention defining generally a rectangular frame for an automotive door hinged for pivotal movement adjacent one side, each J-stiffener having a mounting flange for being secured to the inner surface of the outer door panel.
Figure 5:
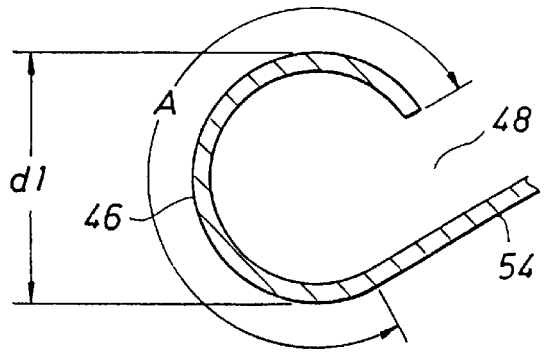
FIG. 5 is an enlarged section of a bead on the free end of the stiffener shown in FIG. 4.
Figure 4:
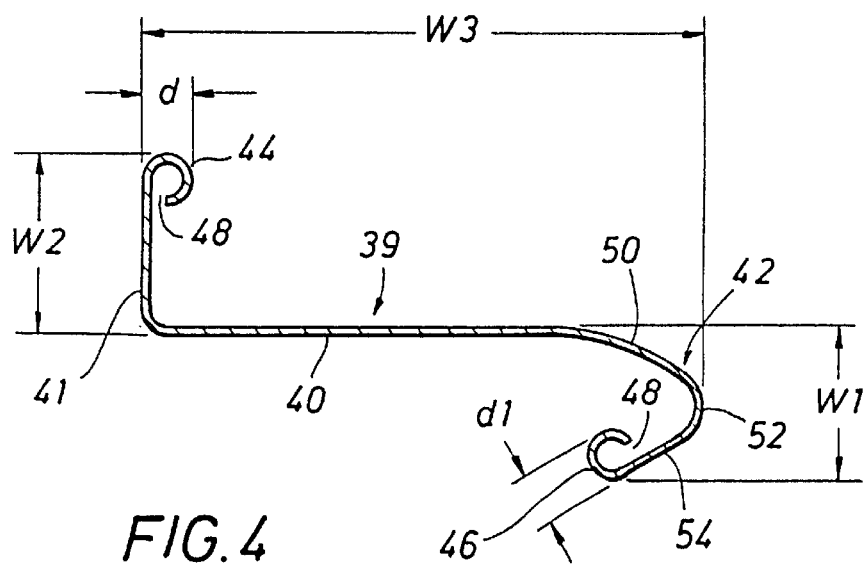
FIG. 4 is an enlarged section taken generally along line 4—4 of FIG. 3 and showing a cross section of a generally horizontal J-stiffener of the generally rectangular frame.

Referring also now to FIGS. 2–6, door 10 is illustrated as the preferred embodiment of the invention. Door 10 has an outer panel 18 with an inner surface 20. Referring now in particular to FIGS. 2 and 3, to reinforce and stiffen automotive door 10, particularly against side impact, stiffeners are generally indicated at 39 and 39A, is mounted on the inner surface 20 of the outside panel 18 and extending between opposite horizontal and vertical sides of the associated door 10. Stiffeners or reinforcing members 39 and 39A are first secured to each other to form a generally rectangular frame 36 as shown in FIG. 3 with stiffeners 39 and 39A joined to each other by transition sections 43. Stiffeners 39 and 39A are generally of a J-shaped configuration with a mounting flange. An intermediate stiffener 39E parallel to stiffeners 39 and of a similar cross section extends between and is secured to stiffeners 39A. Stiffeners 39 will first be described in detail, and then stiffeners 39A. As shown in the drawings, stiffeners 39 are commonly formed of a sheet material such as a steel alloy, although fiber reinforced materials may be preferable in some cases. Stiffeners 39 as shown in FIG. 4 comprise horizontal body or web 40, an integral vertical mounting flange 41 generally at right angles to body 40, and an integral outer bowed flange 42. The opposed free edge portions of mounting flange 41 and bowed flange 42 are downturned inwardly to form open-section tubular beads or edge curls 44 and 46 which may be made generally identical for manufacturing simplicity. An open gap 48 is formed adjacent each tubular bead 44, 46. Tubular beads 44, 46 are shown as being of circular configurations or shapes in cross section and have outer diameters indicated at d and d1. Tubular beads 44, 46 are downturned inwardly an angular amount A of about 270 degrees from the flange 41 and bowed flange 42 as shown in FIG. 5 particularly for bead 46.

Thus, gap 48 is of an angular amount about 90 degrees. If desired, tubular beads 44, 46 could be closed although 270 degrees has been found to be optimum. An angular or circular shape for beads 44, 46 as small as about 210 degrees would function in a satisfactory manner in most instances.

While a circular shape for tubular beads 44 and 46 is preferred, a non-circular elliptical shape would function adequately in most instances. A tubular bead or curl of an elliptical shape has a major axis and a minor axis. For the circular embodiment, the major and minor axes are equal. Diameter or dimension d or d1 for an elliptical shape is interpreted herein for all purposes as the average dimension between the major axis and the minor axis. The major and minor axes are at right angles to each other and are defined as the major and minor dimensions of the open or closed tubular section. To provide an effective elliptical shape for tubular beads 44 and 46, the length of the minor axis should be at least about 40 percent of the length of the major axis. The terms "elliptical" shape and "elliptical" cross section are to be interpreted herein for all purposes as including circular shapes and circular cross sections. Preferably, diameter d1 for bead 46 is larger than diameter d for bead 44. Bowed flange 42 is generally bowl shaped and has an outwardly sloping wall portion 50 extending outwardly from horizontal body 40 to an arcuate apex 52. An integral inwardly sloping wall portion 54 extends from arcuate apex 52 to bead 46.

In order for tubular beads 44, 46 to provide maximum strength with a minimal cross sectional area of stiffener 39, the diameter d1 of tubular bead 46 is selected according to the width W1 of bowed flange 42 as shown in FIG. 5. A ratio of about to 1 between W1 and d1 has been found to provide optimum results. A ratio of W1 to d1 of between about 3 to 1 and 8 to 1 would provide satisfactory results. A similar ratio between W2 and d for tubular bead 44 is utilized. As an example of a suitable stiffener 39, W1 is 1.5 inch, W2 is 1.5 inch, and W3 is 3 inches. The diameter d for bead 44 is ⅜ inch and diameter d1 for bead 46 is ⅜ inch.

In order to obtain the desired minimal weight stiffener, tubular curls or beads 44, 46 must be shaped and formed within precise ranges and sizes in order to provide maximum strength. Using various design formulae to determine the outer diameters of tubular beads 44, 46, an optimum outer diameter of ⅜ inch was found to be satisfactory. However, it is preferred that diameter d1 for curl or bead 46 be slightly larger than diameter d for curl 44. W1 and W2 are between about three (3) and five (5) times the outer diameter of tubular beads 44 and 46 for best results. Width W3 is between about two (2) and five (5) times widths W1 and W2 for best results. By providing such a relationship between tubular beads 44, 46 and widths W1 and W2 the moment of inertia is maximized and edge stress concentrations are minimized for stiffener 39 thereby permitting the lightweight construction for stiffener 39 of the present invention. Tubular beads 44, 46 are illustrated as turned inwardly which is the most desirable. In some instances it may be desirable to have a tubular curl turned outwardly.

Figure 6:
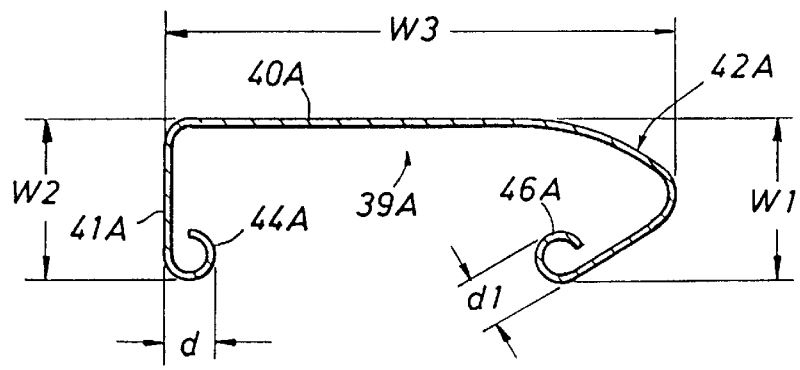
FIG. 6 is an enlarged section taken generally along line 6—6 of FIG. 3 and showing a cross section of a generally vertical J-stiffener of the generally rectangular frame.

FIG. 6 shows another embodiment of a stiffener in which stiffener 39A has a mounting flange 41A extending from body 40A in the same direction as outer bowed flange 42A. Tubular curls or beads 44A and 46A together with the dimensions shown at W1, W2, W3, d, and d1 are similar to the embodiment shown in FIG. 4. The only change in the embodiment of FIG. 6 from the embodiment of FIG. 4 is the direction in which mounting flange 41A extends. Stiffeners 39 extend in a horizontal direction perpendicular to the pivotal axis of door 10. Stiffeners 39A extend in a vertical direction generally parallel to the pivotal axis of door 10. Transition section 43 is provided near the ends of the outer stiffeners 39 and 39A.

As shown particularly in FIG. 3 in which frame 36 is first formed by stiffeners 39 and 39A before securement to inner surface 20 of outer door panel 18, the ends of stiffeners 39 may be modified in order to be attached to stiffeners 39A by transition sections 43 to form frame 36. This may include removing a segment of the tubular edge of stiffener 39, or simply flattening it locally to accommodate joining of stiffeners 39, 39A in order to obtain a more rigid and integrated structural support of the outer door panel. While stiffener 39 has been shown as mounted adjacent the upper side of door section 10, stiffener 39 may, if desired, be mounted intermediate the width of door section 10. Additional stiffeners 39 or 39A may be mounted at various angles on each door section 10 of a vehicle or on the hood or trunk lid of an automotive vehicle in order to enhance the overall structural performance of the vehicle, or to achieve other design objectives.

Each stiffener 39, 39A is preferably secured to each of the door outer panels, for example, and has a thickness of 19 gauge (0.047 inch) with W1 and W2 being one inch and W3 being 2 ¾ inches. Diameter d is ¼ inch and diameter d1 is ⅜ inch. High strength steel is used to enhance the strength of the door against side impact.

Figure 7:
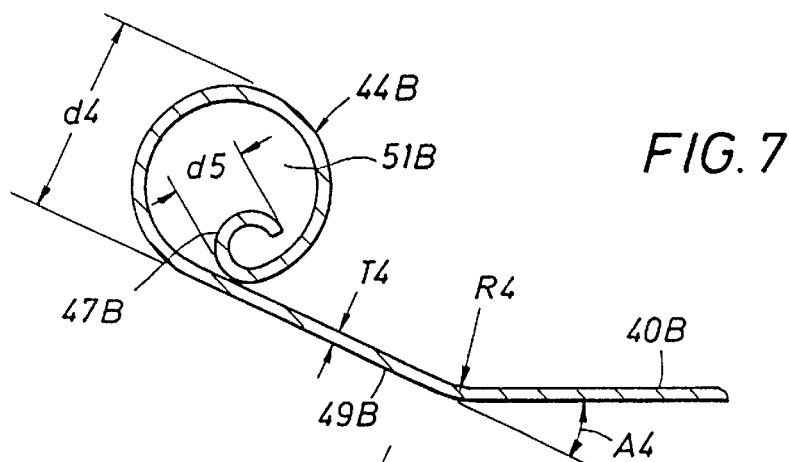
FIGS. 7 and 8 are enlarged sectional views of modified beads on a free end of a stiffener.
Figure 8:
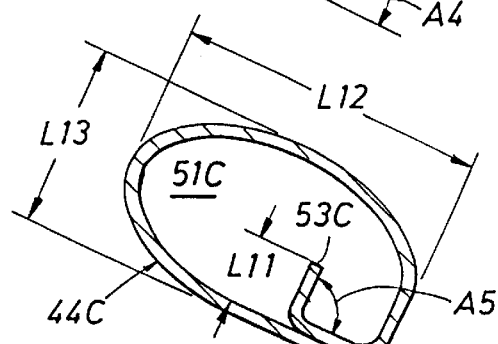

FIGS. 7 and 8 show separate embodiments in which the bead or curl is strengthened as may be desired when the outer diameter to thickness ratio of the bead is greater than about 15. As shown in FIG. 7, the outer diameter of bead 44B is shown at d4 and the thickness is shown at T4. Bead 44B forms an enclosed area 51B and a small elliptical bead or curl 47B having a diameter d5 is formed inside bead 44B. A curl flange 49B extending at an angular relation to body 40B as defined by angle A4 may also be provided having a radius R4 and thickness T4 to further stabilize bead 44B. For a ratio between radius R4 and thickness T4 less than about 3.5, with angle A4 being at least about 25 degrees a special strengthening effect is obtained which causes the curl flange 49B to act together with tubular bead 44B so that the entire edge is substantially strengthened against deformation and sectional warping such as may occur during a vehicle crash. This added stabilization is thus a very useful extension of the capabilities of the present invention.

In the embodiment of FIG. 8, bead or curl 44C has a lip 53C with a length L11 extending within the enclosed area 51C of bead 44C from the free edge of bead 44C. Angle A5 is between 30 and 120 degrees for best results, and the length L11 of lip 53C is between ⅕ and ⅘ of the average of dimensions L12 and L13 for best results. Longer lips may be used, but usually with limited additional benefits over the benefits of the range given.

Figure 9:
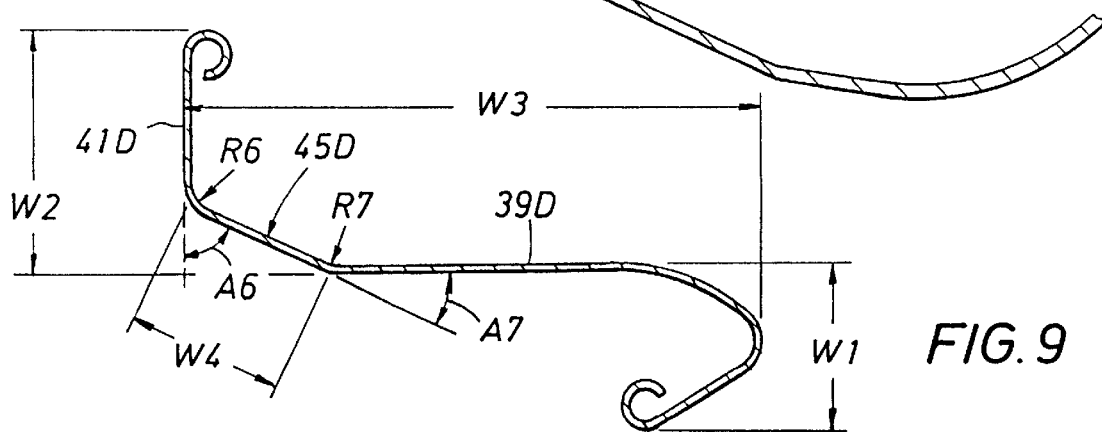
FIG. 9 is an enlarged section of a modified stiffener in which an intermediate connecting flange portion extends in an angular relation between the mounting flange and web of the modified stiffener.

Referring now to FIG. 9, a separate embodiment of a stiffener 39D is illustrated which is similar to stiffener 39 shown in FIG. 4 except for an intermediate connecting flange portion 45D extending between mounting flange 41D and body or web 40D. Connecting flange portion 45D extends at an angle A6 and radius R6 with respect to mounting flange 41D and at an angle A7 and radius R7 with respect to the body. Connecting flange portion 45D is of a width W4. Radius R6 and radius R7 are each less than 3.5 times the thickness of stiffener 39D for best results. Angle A7 is preferably at least about 25 degrees in a positive or negative direction. The length of W4 is generally smaller than the length of W3 for best results. W1, W2 and W3 are generally similar to W1, W2 and W3 of FIG. 4.

As a result of providing the inturned tubular beads or curls along the marginal edge portions of the stiffener, an unexpected significantly thinner gauge material generally about twenty percent lighter has been utilized for the stiffener as compared with conventional prior art door stiffeners as utilized heretofore. By utilizing precise tubular beads as set forth herein on the selected members where it is most needed for strength, a manufacturer may utilize an unexpected substantially thinner gauge material while eliminating or minimizing problems encountered heretofore by prior art designs of stiffeners for automotive doors and closures.

While the stiffeners have been illustrated in the preferred embodiment as applied to the door of an automotive vehicle, it is apparent that said stiffeners may be applied to other closures of an automotive vehicle, such as a hood and trunk lid. In such instances for example, a pair of generally parallel stiffeners may be mounted extending in a direction generally perpendicular to the pivotal axis of the closures.

While the particular invention as herein shown and disclosed in detail is fully capable of obtaining the objects and providing the advantages hereinbefore stated, it is understood that this disclosure is merely illustrative of the presently preferred embodiments of the invention and that no limitations are intended other than as described in the appended claims.

What is claimed is:

1. A closure for an automotive vehicle comprising:
   a sheet body mounted for pivotal movement about a rotational axis on the vehicle between open and closed positions;
   a stiffener mounted on said body and extending along said body in a transverse direction from said rotational axis on said vehicle;
   said stiffener defining in cross section a web and a flange extending outwardly from each end of said web, each of the flanges having a free edge; and
   a tubular bead extending along the free edge of each flange for reinforcing the flanges.

2. The closure as defined in claim 1, wherein said tubular beads are inturned and of an elliptical cross section wherein the minor axis is at least about 40 percent of the major axis.

3. The closure as defined claim 2, wherein said intumed tubular beads are of a circular cross section and extend in a circular path of at least about 210 degrees.

4. The closure as defined in claim 2, wherein at least one of said flanges of said stiffener extends in a perpendicular relation to said web and has a planar surface for securement to said body for mounting said stiffener thereon.

5. The closure as defined in claim 2, wherein said closure is a door and said bead has a closed end to define an enclosed area; and a curled end portion of said bead extends within said enclosed area from said closed end to provide additional reinforcing.

6. The closure as defined in claim 5, wherein said curled end portion is of an elliptical cross section.

7. The closure as defined in claim 5, wherein said curled end portion includes a planar flange extending within said enclosed area.

8. The closure as defined in claim 4, further comprising; an intermediate connecting section between said web and said one flange, said connecting section extending from said web at an angle of at least about 25 degrees.

9. The closure as defined in claim 4, wherein the other of said flanges is bowed outwardly and said bead is mounted on the free end of the bowed flange.

10. The closure as defined in claim 2, wherein said closure comprises a sheet metal hood on said automotive vehicle mounted for pivotal movement about a rotational axis on said vehicle, and a pair of substantially symmetrically placed stiffeners extend from said rotational axis in a transverse relation.

11. The closure as defined in claim 2, wherein said closure comprises a trunk lid mounted for pivotal movement about a rotational axis on said vehicle, and a pair of substantially symmetrically placed stiffeners extend in a transverse relation from said rotational axis.

12. The closure as defined in claim 1, wherein said closure includes a door having an outer panel and further comprises a pair of substantially parallel stiffeners secured to said outer panel and extending in a horizontal direction, and a pair of substantially parallel stiffeners secured to said outer panel and extending in a vertical direction between opposite ends of said horizontal stiffeners to define a generally rectangular reinforcing frame secured to said outer panel.

13. The closure as defined in claim 12, wherein each of said stiffeners has a web and a flange extending outwardly from each end of said web, one of said flanges having an outer planar surface extending outwardly from said web in a perpendicular direction and said other flange being bowed to define a smooth outer curved surface.

14. The closure as defined in claim 13, wherein each of said flanges has a free edge and a tubular bead extends along the free edge of each flange, said tubular beads being inturned and of an elliptical cross section wherein the minor axis is at least about 40 percent of the major axis.

15. A door for an automotive vehicle comprising:
    a sheet body having an outer panel and mounted for pivotal movement about a rotational axis on the vehicle between open and closed positions;
    a generally rectangular reinforcing frame secured to said outer panel, said frame including a pair of generally vertical parallel reinforcing members and a pair of generally horizontal parallel reinforcing members connected near opposite ends of said vertical members;
    each reinforcing member defining in cross section a web and a flange extending outwardly from each end of the webs, each of said flanges having a free edge; and
    a tubular inturned bead extending along the free edge of each flange for reinforcing the flanges.

16. The door for an automotive vehicle as defined in claim 15, wherein said tubular beads are of an elliptical cross section in which the minor axis is at least about 40 percent of the major axis.

17. The door as defined in claim 16, wherein said inturned tubular beads are of a circular cross section and extend in a circular path of at least about 210 degrees.

18. The door as defined in claim 16, wherein at least one of said flanges of each reinforcing member has a planar surface for securement to said body for mounting said reinforcing members thereon.

19. The door as defined in claim 15, wherein at least some of said beads have a closed end to define an enclosed area, and an end portion of the bead extends within said enclosed area.

20. The door as defined in claim 19, wherein said end portion comprises a curled end portion of an elliptical cross section.

21. The door as defined in claim 19, wherein said end portion includes a planar flange extending within said enclosed area in an upstanding relation.

22. A door as defined in claim 15, wherein at least one of said flanges of each reinforcing member has a planar surface for securement to said body for mounting said reinforcing members thereon.

23. The door as defined in claim 22, wherein the other of said flanges is curved to form a smooth outer surface and said bead is mounted on the free end of the curved flange.

* * * * *